Aug. 29, 1950
H. T. WHITE
2,520,791
COMPENSATING MOTOR STARTING RELAY
FOR SINGLE SPLIT PHASE MOTORS
Filed Sept. 22, 1947
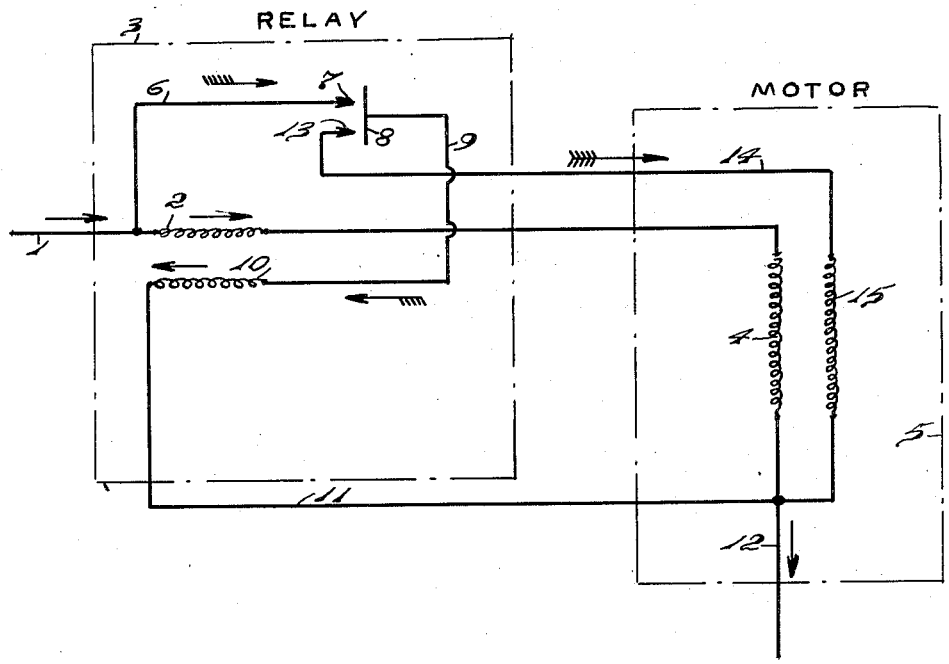
INVENTOR.
Howard T. White
BY
Herbert S. Fairbanks
ATTORNEY.

Patented Aug. 29, 1950

2,520,791

UNITED STATES PATENT OFFICE 2,520,791

COMPENSATING MOTOR STARTING RELAY FOR SINGLE SPLIT PHASE MOTORS

Howard T. White, Philadelphia, Pa.

Application September 22, 1947, Serial No. 775,476

1 Claim. (Cl. 318—221)

The object of this invention is to devise a novel relay for motors and especially for motors which are combined with pumps. The relays on the market were found to be inefficient since they did not overcome or compensate for the variables existing in the field and the internal motor characteristics.

With the conventional starting relay, many field failures occurred in motor operation. It was thus found necessary to devise a new principle for a relay which would have a variability sufficiently large to overcome all voltage fluctuations, hot and cold motors, production tolerances, close air gaps, critical spring adjustments, and motor overload.

I have found as a result of numerous experiments that if a coil is employed in the relay which will compensate the line fluctuation differential against the motor fluctuating currents a balanced point of operation is provided for the relay. This coil is subtractive in its current relationship with the coil that is in series with the running winding of the motor and is in parallel with the line for the starting winding of the motor.

With the foregoing and other objects in view, as will hereinafter clearly appear, my invention comprehends a novel compensating, motor starting relay.

For the purpose of illustrating the invention, I have shown in the accompanying drawings a preferred embodiment of it which I have found in practice to give satisfactory and reliable results. It is, however, to be understood that the various instrumentalities of which the invention consists can be variously arranged and organized and the invention is not limited to the exact arrangement and organization of these instrumentalities as herein set forth.

The drawing is a wiring diagram of the relay and motor.

Referring to the drawing:

The input leads 1 and 12 may be ninety to one hundred and thirty volts. The input lead 1 is connected in series to a series coil 2 of a relay 3. The series coil 2 is connected in series with the running winding 4 of a motor 5. The input lead 12 is connected with the running winding of the motor.

The input lead 1, anterior to the series coil 2, is connected by a shunt line 6 with a contact 7 of the relay, and by movable contact 8 and line 9 with a compensating coil 10 of the relay. The relay coil 10 is connected by line 11 with the input lead 12 to the motor windings. The second fixed relay contact 13 is connected by line 14 with the starting winding 15 of the motor, and said starting winding is connected with the input lead 12. The broken line indicates the enclosure for the parts of the motor.

It will thus be apparent that one relay coil is in series with the running winding of the motor giving a variable I relative to the E. M. F. of motor. The current trips at speeds corresponding to 1400 R. P. M. The other coil is in parallel with the field and cuts the current down to a constant current since the relay fields or coils are in opposition.

I therefore assure positive release at cross over point.

Being a single split phase motor, the starting winding must be in the circuit only until the motor comes up to speed. The relay contacts are closed when the motor fields are energized by the heavy starting current. This closing of contact points brings the compensator winding and starting winding across the line.

When the motor is nearly up to speed, the current is weak enough to allow the relay contacts to open, taking the starting winding and the compensator winding out of the circuit.

The purpose of the compensating winding on the dead side of the relay is to allow more current to flow in the relay coil 2, assuring closing of the contacts. The compensating winding then weakens the field assuring release of the contacts and also compensating for line voltage fluctuations, hot and cold motors, production tolerances, close air gaps, critical spring adjustments and motor overload.

Having thus described my invention, what I claim as new and desire to secure by Letters Patent is:

A motor having a starting winding and a running winding, a relay having a series coil and a compensating coil wound in opposition with a common core, an input lead in series with the series coil, said series coil being continuously connected with the running winding, an input lead connected with the starting and running windings of the motor, a shunt line from the input lead for the series coil connected with a first relay contact, a movable contact of the relay being connected to the compensating coil, the relay having a second contact connected with the starting winding of the motor and controlled by said movable contact, and said compensating coil being connected with the starting and running windings of the motor and their input lead.

HOWARD T. WHITE.

REFERENCES CITED

The following references are of record in the file of this patent:

UNITED STATES PATENTS

| Number | Name | Date |
| --- | --- | --- |
| 1,921,127 | Hult | Aug. 8, 1933 |
| 1,921,204 | Nickle | Aug. 8, 1933 |
| 1,981,259 | Wert | Nov. 20, 1934 |
| 2,021,199 | Pearce | Nov. 19, 1935 |
| 2,262,417 | Wolfert | Jan. 26, 1940 |
| 2,431,025 | Buell | Nov. 18, 1947 |